US010479665B2

(12) United States Patent
Adams

(10) Patent No.: US 10,479,665 B2
(45) Date of Patent: Nov. 19, 2019

(54) GOODS MOVEMENT APPARATUS

(71) Applicant: William Mark Adams, Sutton Cum Lound (GB)

(72) Inventor: William Mark Adams, Sutton Cum Lound (GB)

(73) Assignee: William Mark Adams, Sutton Cum Lound (GB)

( * ) Notice: Subject to any disclaimer, the term of this patent is extended or adjusted under 35 U.S.C. 154(b) by 129 days.

(21) Appl. No.: 15/165,037

(22) Filed: May 26, 2016

(65) Prior Publication Data
US 2017/0341917 A1 Nov. 30, 2017

(51) Int. Cl.
*B66F 17/00* (2006.01)
*B65G 67/20* (2006.01)
*G01G 19/10* (2006.01)
*B66F 9/075* (2006.01)
*B66F 11/04* (2006.01)
*G01G 19/08* (2006.01)
*B65G 69/28* (2006.01)

(52) U.S. Cl.
CPC ............ *B66F 17/006* (2013.01); *B65G 67/20* (2013.01); *B66F 9/0759* (2013.01); *B66F 11/04* (2013.01); *G01G 19/08* (2013.01); *G01G 19/10* (2013.01); *B65G 69/2864* (2013.01)

(58) Field of Classification Search
CPC ....................... B65G 69/2864; B65G 6969/24; B65G 67/20; B66F 11/04; B66F 17/006; B66F 9/0759; B66B 17/18; G01G 19/10; G01G 19/08
See application file for complete search history.

(56) References Cited

U.S. PATENT DOCUMENTS

| 3,324,287 | A | * | 6/1967 | Fetterman | G01G 19/12 177/136 |
| 4,940,379 | A | * | 7/1990 | Staege | B65G 69/006 14/71.7 |
| 9,631,969 | B1 | * | 4/2017 | Whalen | G01G 19/02 |
| 9,669,749 | B2 | * | 6/2017 | Walker | B60P 1/4492 |

FOREIGN PATENT DOCUMENTS

| EP | 2439504 A2 * | 4/2012 | ........... G01G 19/083 |
| EP | 2732999 A2 * | 5/2014 | ............. B60J 5/125 |
| GB | 920101 | * 10/1961 | |

* cited by examiner

*Primary Examiner* — Mark C Hageman
(74) *Attorney, Agent, or Firm* — Woodward, Emhardt, Henry, Reeves & Wagner, LLP

(57) ABSTRACT

The invention relates to apparatus for use in the movement of goods and includes a transportable goods storage area or trailer. The trailer can be moved to a position adjacent a platform of lifting apparatus to allow goods to be moved to and from the trailer. A bridging assembly including one or more bridge portions is provided to form a bridge between the plat form and floor of the trailer. In one embodiment weight detection means are provided to allow the weight of the transportable goods storage area or trailer, and the goods therein, to be detected and compared to predetermined weight limits.

21 Claims, 16 Drawing Sheets

GOODS MOVEMENT APPARATUS

Figure 1:
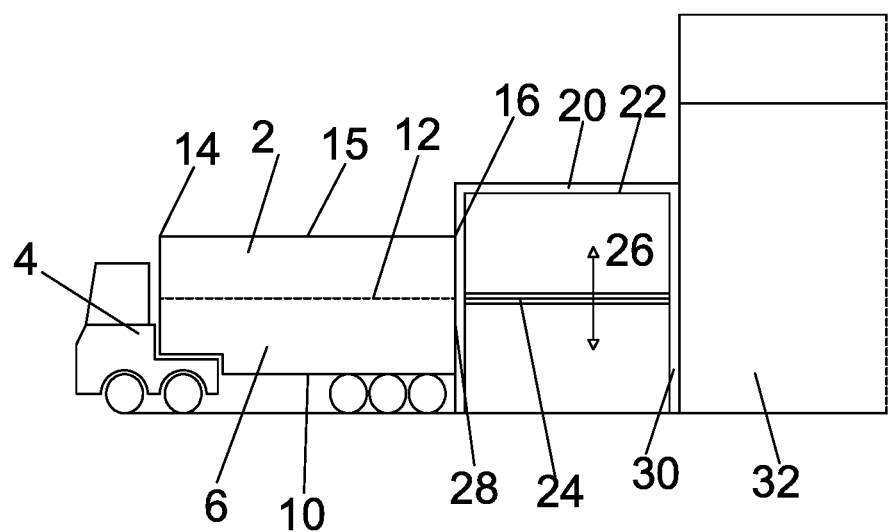

The invention to which this application relates, is in relation to apparatus for use in the movement of goods. In particular, although not necessary exclusively, the invention is for use in the movement of goods between storage areas, such as a first storage area in the form of a warehouse and a second storage area in the form of a transportable area such as a vehicle trailer provided as part of a vehicle.

The movement of goods across a geographical area is most commonly achieved by vehicles which have a trailer in which goods are stored and moved. The goods may be separate items such as parcels or the like, or may be grouped together and moved on pallets, trolleys, wheeled cages, or the like. In any case, there is a need for the goods to be unloaded from, and loaded onto, the trailer, most typically at a location such as a warehouse, and a loading bay provided as part of the same.

The apparatus of the type to which the application relates includes a platform which is vertically movable and on which the goods can be lifted and lowered with respect to a support frame to allow the platform to be brought to the desired floor height of an adjacent storage area and which floors are often provided at different heights. Once the platform is at the appropriate height the goods can be moved to and from the adjacent floor which is at the same height. Typically, the support frame is located such that one end of the platform is locatable adjacent an edge of a floor of a first of the goods storage areas and the opposing end of the platform is locatable adjacent an edge of a floor of the second of the goods storage areas.

A problem which is experienced with apparatus of this type is how to bridge a gap which exists between an end of the platform and the edge of the adjacent floor, and, in particular, the floor of the transportable storage area. It should be appreciated that typically the goods are moved through an end of the transportable storage area and that typically the opening is relatively narrow and confined, which is especially the case if there is provided a tail lift assembly and/or door assembly at the opening. When provided, a rail lift assembly is provided such that a portion of the same can be moved to an extended position outwardly from, and externally of, the opening and provide a limited floor space to allow goods to be moved onto the same and then be moved to ground level, typically at a location for delivery of the goods such as to a retail unit.

The doors which are provided to selectively open and close the opening can take several forms but one possible form is that defined in the applicant's co-pending application number EP2732999 in which there are provided first and second doors which are vertically movable to allow selective access to portions of the opening into the trailer and typically to allow access to a floor of the trailer at a first height and, by movement of the doors, to allow access to a floor at a spaced height above the first floor in the trailer. Another form of door which can be used is a shutter which is movable between an extended open and a closed position in which the shutter door is rolled up and stored typically at the top of the opening.

The provision of this door apparatus at the opening and positioned between the end of the storage area frame and the end of at least the raised floor of the trailer, and the confined size of the opening, means that the bridging of the gap between the respective edges of the floor of the storage area and platform is difficult to achieve and is currently not safely possible in a manner which allows a secure and supported access path, especially when one considers the weighs of the goods which may be moved across the same and the requirement to allow safe passage of personnel across the same. A further problem is that the operator of the apparatus will typically be standing on the platform of the lifting apparatus and when the have moved the platform to the required height they are required to lean out from the edge of the platform, typically over a safety barrier, in order to try and reach the door, or handle for the same, of the transportable goods storage area, in order to be able to move the door to gain access to the interior of the good storage area. This can be hazardous to the operator where there is a risk of falling from the platform and/or not being able to reach the door to operate the same.

A further problem with goods carrying trailers for vehicles is that although there are many different types of trailers, there is always a need to ensure that the trailer, when it is fully loaded, does not exceed recommended, or legal, weight limits. The reason for this is to ensure chat the trailer, when being transported on public roads, is not overly susceptible to tipping over or causing problems to the transport of the apparatus due to overloading. Conventionally, this problem is addressed by the provision and use of a weighbridge which is of a size to accommodate the trailer, and the tractor unit used to pull the trailer, when the tractor unit and trailer are joined together on the weighbridge. The combined weight of the same is detected and a decision can then be made as to whether the combined weight of the tractor unit and trailer exceeds, or is below, a predefined weight limit. If the weight is below the limit, then the use of the tractor and trailer can proceed onto the road, whereas if the weight is above the pre-defined limit then goods will need to be removed from the trailer until the weight drops below the pre-defined limit.

While this system is acceptable for the weighing of the trailer and tractor in combination, it is not known to be able to detect the weight of the trailer with goods loaded therein when the tractor is separate from the tractor unit. This can cause problems in relatively high usage warehouse environments, where the trailer will often be loaded with the goods from the warehouse, without the tractor unit being attached to the trailer.

While it would be possible for the trailer and tractor unit, once the same are joined together, to be moved and then subsequently weighed using the conventional weighbridge apparatus, this would mean that if the trailer is overloaded and above a predefined weight, the trailer would have to be returned to the warehouse to be unloaded. This takes up loading space in the warehouse facility while the required amount of goods are unloaded from the same and the provision of the loading space can be difficult to achieve on an unscheduled basis in relatively high usage environments and therefore causes unnecessary expense to the warehouse operator and/or transport operator and loss of time.

A first aim of the invention is therefore to provide improvements to a goods transport trailer which allows the safer use of the same. One aim of the invention is to provide bridging apparatus and method which allows the gap to be bridged safety and repeatedly and a further aim of the invention is to provide a means of moving components to allow the operation of doors or lifts at the opening to another location in the goods storage area whilst ensuring that the lifts or doors operate efficiently. A further aim is to provide the apparatus at the opening of the transportable storage area in a manner which minimises the impact on access through the opening. A further aim of the invention is to provide a means of allowing improved access to the door to operate the same whilst minimising the risk to the operator. A further aim is to provide the apparatus at the opening of the transportable storage area in a manner which minimises the impact on access through the opening.

A further aim of the present invention is therefore to provide apparatus which allows the weight of a trailer, with goods thereon, to be detected, without the need for the trailer to be connected to the tractor unit at that time.

In a first aspect of the invention there is provided apparatus for the movement of goods, said apparatus including at least one goods storage area having a floor for the location of goods thereon, said storage area having an opening through which goods can be moved, said opening selectively closed by a door assembly;

lifting apparatus including a frame and a platform movable in relation thereto and on which goods can be located, when the goods storage area and the lifting apparatus are in an abutting relationship and the said floor and the said platform are at the same height, an edge of the platform and an edge of the said floor are spaced apart by a gap and wherein the apparatus includes a bridging assembly including at least one bridge portion selectively movable to form a bridge across the said gap to allow goods to be moved between the said floor and the platform across said bridge and said at least one bridge portion is moveable between a withdrawn storage position and an in-use bridging position.

In one embodiment the bridging assembly includes first, inner and second outer bridge portions, said portions relatively movable to allow the bridging assembly to be provided in storage and in-use positions and a position intermediate the in use and storage positions.

In one embodiment in the storage position the portions are provided in an upstanding position substantially perpendicular to the platform support surface and in the an use position the said portions of the bridging assembly are substantially in line with the platform and in the intermediate position, the inner portion is substantially in line with the platform and the outer portion is in the upstanding position.

Typically, in the intermediate position, the outer portion acts as a barrier to prevent a person from stepping out from the edge of the inner portion.

In one embodiment the inner portion is pivotally movable with respect to the platform at a first edge of the inner portion. In one embodiment the outer portion is pivotally movable with respect to the inner portion at a second edge of the inner portion.

In one embodiment the movement of the said bridge portions is controlled by hydraulic control means so as to be capable of a two stage movement between the storage, intermediate, and in use positions.

Typically, when in the in-use position, the free end of the outer portion of the bridging assembly extends to and over the edge of a floor of the goods storage area which can also act as a support means, and thereby form a continuous goods movement path between the platform and the floor of the goods storage area.

In one embodiment, when the bridging assembly is in the intermediate position, the gap between the edge of the inner bridge portion and the edge of the floor of the goods storage area is less than the gap between the edge of the platform and the edge of the floor of the goods storage area. In one embodiment the reduced gap is such that access to the door assembly to operate the same can be achieved by a person when standing on the inner bridge portion of the bridging assembly.

In one embodiment the door assembly is a sliding door assembly such as a shutter door or the door assembly in the applicant's co pending patent application EP2732999. The door of the assembly is movable in a linear direction to allow the opening to be opened or closed. In one embodiment the door may be formed from a number of portions which can be selectively moved to allow selective access to portions of the opening.

Typically the said goods storage area is a vehicle trailer which can be moved into position such that the opening through which the goods are to be moved is positioned adjacent to the said edge of the platform of the lifting apparatus.

In one embodiment the bridging assembly attached to the platform can be moved into the intermediate position prior to the door assembly of the goods storage area being moved to an open position. Typically, once the door assembly is open to allow access to the floor of the goods storage area, the outer bridge portion of the bridging assembly can be moved into the goods storage area to contact with the floor of the same.

In one embodiment the gap between the edge of the platform and the edge of the floor of the goods storage area, when the goods storage area and movement apparatus are in an abutting position, is of a distance to allow access to the door assembly of the goods storage area and/or a shutter assembly of the lifting apparatus by a person standing on the bridging assembly when in the intermediate position.

In one embodiment the door assembly is located intermediate the said floor edge and the support means.

In one embodiment a first bridge portion is movably located on the platform and a second bridge portion is movably located on the said floor Typically the support means is provided as part of the goods storage area and the support, means and the edge of the floor define opposing side walls of a space through which at least a portion of the door assembly can pass.

In one embodiment, at least one, but typically both, of the bridge portions are pivotally movable between a storage position and an in use position in which the same form a path between the platform and the floor and allow the passage of goods and/or personnel thereacross.

In one embodiment both of the first and second bridge portions are provided m contact with the support means when they are in the in use position.

In one embodiment at least part of the support means is movable into apposition to support at least one of the bridge portions when in the in use position. Alternatively the support means are provided in a fixed position.

Typically the support means are provided as an integral part of the chassis of the goods storage area.

In one embodiment the door assembly is a sliding door assembly such as a shutter door in which the door is movable in a linear direction down or up from the top of the goods storage area, or can be a door assembly in which first a second doors are linearly movable to selected positions to allow selective access to portions of the opening.

Typically first and second vertically spaced floors are provided in the goods storage area with the first floor forming the base and the further floor located between the first floor and the roof.

In one embodiment the door assembly comprises first and second panel portions which are independently moveable so as to achieve a first configuration in which the access opening is closed, a second configuration in which the panels at least partially overlap to allow access to the storage area defined between the first floor and the further floor, and a third configuration in which the panels at least partially overlap to allow access to the storage area defined between the further floor and the roof.

In one embodiment at least one of the panels is movable such that movement of the said one panel causes movement of the other panel in order to obtain the required configuration.

In one embodiment the panels are mounted on pulleys in order to allow the same to be moved. Typically locking means are provided in order to retain at least one of the panels in position in each configuration.

In one embodiment the goods storage area includes a portion which is mounted on the further floor and/or a portion which is mounted on the roof and each portion which is provided is moveable between a first position in which the same is substantially in line with the remainder of the roof, or further floor, respectively and a second position in which at least part of the portion is raised.

In one embodiment the bridge portion connected to the platform is provided for powered movement between the in use and storage positions and the bridge portion connected to the goods storage area is provided to be capable of movement under the influence of the movement and/or position of the door assembly mounted thereon.

In one embodiment the bridge portion attached to the platform is first movable into contact with the support means once the goods storage is in position and can be moved into position prior to the door assembly of the goods storage area being moved to an open position. Typically, once the bridge portion has been moved to contact the support means, so the door assembly can be moved to the open position and the bridge portion of the goods storage area is then free to be moved to the in use position in contact with the support means.

In one embodiment the goods storage area is a trailer and at, or towards, a first, front, end of the trailer there are provided a plurality of support members so as to support the trailer at a height from a support surface when the trailer is not attached to a tractor unit, and at or towards a second, rear end of the trailer there are provided a plurality of axles on which wheels are mounted to support and move the trailer along the support surface and wherein, detection means are provided to detect the load which is applied to the plurality of axles and the load which is applied to the support members so as to provide an indication of the weight of the trailer at an instant of time.

In one embodiment the defection means for the rear axles, detect the air pressure of a pneumatic air system which controls the operation of the suspension of the rear axles with respect to the trailer and the detected pressure value is translated into an equivalent weight value.

In one embodiment the support members are movable between an extended position to provide the support for the trailer and a withdrawn position when the trailer is mounted to the tractor unit.

In one embodiment the support members are movable between the said positions by a manual mechanical movement system or by a hydraulic system and the detection means for the support members are located so as to detect the condition of the hydraulic system and/or the force applied to the manual movement system when the support members are in the extended position and the detected values are translated into an equivalent weight value.

In one embodiment the visual display is provided at at least one location on the trailer so as to allow the weight of the trailer at that instant of time, to be displayed.

In one embodiment the visual display means provides a visual indication if the detected weight value exceeds a predetermined weight limit.

In one embodiment the trailer cavity is formed with a first floor and a second floor, spaced vertically from the first, so as to define two cavity portions, both of which are accessed via an opening located at the rear end of the trailer.

In one embodiment the weight of the goods in each of the cavity portions is separately identified and also combined to provide a weight for all of the goods in the trailer.

In one embodiment the goods storage area is provided with a tail lift which can be moved to an in use position when the goods storage area is at a location which is remote from the lifting apparatus, said apparatus including a portion which is movable in a linear direction to alter the height of the same, and to allow the same to be deployed between in use and storage positions and wherein the powered movement apparatus is located towards the opposing end of the goods storage from the opening at which the tail lift is mounted.

In one embodiment, the tail lift portion is movable along guide means located at or adjacent to the opening and is connected to the powered movement apparatus via one or more elongate members. In one embodiment the elongate members are chains or cables.

In a further aspect of the invention there is provided lifting apparatus for the movement of goods, said apparatus including a frame and a platform on which goods can be located, said platform movable in relation to the frame and characterised in that at an edge of the said platform there is provided a bridging assembly, said bridging assembly movable between a withdrawn storage position and an in-use position extending beyond the edge of the platform and wherein the bridging assembly is formed of a first, inner and a second, outer, bridge portion, said bridge portions relatively movable to allow the bridging assembly to be provided in a position intermediate the in use and storage positions.

In a further aspect of the invention there is provided a method of moving goods between lifting apparatus and a goods storage area, said method comprising the steps of moving the good storage area such that an opening of the same is positioned adjacent an edge of the platform, said opening closed by a door assembly, said goods storage area formed by at least one floor, side walls, end walls and a roof, and characterised by moving a bridging assembly located at the edge of the said platform such that an inner bridge portion of the bridging assembly is moved with respect to the platform to be substantially in line with the platform, using the inner bridge portion to allow access to operate the door assembly to allow access to a floor of the goods storage area and moving the outer bridge portion of the bridging assembly to lie substantially in line with the inner bridge portion and form a path for goods movement between the platform and the said floor of the goods storage area.

In a further aspect of the invention there is provided a transportable goods storage apparatus, said apparatus including a goods storage area defined by opposing side walls, a roof, at least one floor, a first end and a second end in which an opening is provided to allow goods to be moved, therethrough into and from the interior of the goods storage area, said apparatus including a tail lift which has a portion located externally of the said opening and which is movable in a linear direction to along guide means to alter the height of the same, and to allow the same to be deployed between in use and storage positions and wherein the powered movement apparatus is located towards the said first end of the goods storage area and connected to the said portion via one or more elongate members.

In a further aspect of the invention there is provided a trailer apparatus for the transport of goods therein, said trailer having a cavity in which the goods are held, and at, or towards the front end of the trailer there are provided a plurality of support members as to support the trailer at a height from a support surface when the trailer is not attached to the tractor unit, and at, or towards the rear of the trailer there are provided a plurality of axles on which wheels are mounted to move the trailer along the support surface and wherein, detection means are provided to detect the load which is applied to the plurality of axles and the load which is applied to the support members so as to provide an indication of the weight of the trailer at an instant of time.

In one embodiment, the detection means for the rear axles, detect the air pressure of the pneumatic air system which controls the operation of the suspension of the rear axles. Typically, the detected pressure can then be translated into an equivalent weight value.

In one embodiment, the support members can be moved between an extended position to provide the support for the trailer and a withdrawn position when the trailer is mounted to the tractor unit.

In one embodiment the movement of the support members between the positions is by a manual mechanical movement system or in another embodiment the movement of the support members between the positions is via operation of a hydraulic system.

Typically the detection means are located so as to detect the condition of the hydraulic system and/or the force applied to the manual movement system when the support members are in the extended position.

Typically the detected values are translated into an equivalent weight value.

Typically therefore the weight of the trailer at an instant of time, can be determined with reference to the determined weight values for support members and the suspension system for the rear axles and the said values are combined to provide an indication of the overall trailer weight.

Preferably, any operating interface for the support members and/or the manual movement means for the support members, are located at the offside of the trailer so as to be selectively operated by the user of the trailer.

In one embodiment, display means are provided at at least one location on the trailer so as to allow the weight of the trailer at that instant of time, to be displayed.

In one embodiment, the display means are located within the cavity so as to be viewable by the user of the trailer as goods are loaded into the trailer and thereby allow the user to determine if or when the weight of the trailer is approaching or exceeds a pre-determined weight limit.

In one embodiment, the trailer cavity includes a first floor, and a second floor, spaced vertically from the first, so as to define two cavity portions, both of which are accessed via an opening located at the rear end of the trailer.

In one embodiment the weight of each of goods in each of the cavity portions can be separately identified and also combined to provide a weight for all of the goods in the trailer.

In one embodiment this is achieved by loading the goods onto one of the floors first, typically the lower first floor and then closing the access doors and detection means detect the closure which allows the weight increase at that time to be allocated to the goods on the lower floor. When the doors are subsequently moved or opened to allow access to load goods onto the second upper floor, the additional load is allocated to the second floor.

Typically the sensing means are microswitches which detect the opening and closing or movement of the door parts.

In one embodiment the door system used is described in the applicant's patent application EP2732999.

In this embodiment, a display means can be provided in each of the said cavity portions.

Specific embodiments of the invention are now described with reference to the accompanying drawings; wherein FIG. 1 illustrates a goods storage area and lifting apparatus in a schematic manner in accordance with one embodiment of the invention;

FIGS. 2a and 2b illustrate first and second embodiments of door assemblies of the type which can be used with the current invention;

FIG. 3a-f illustrate an elevation of the apparatus in accordance with one embodiment of the invention in operation.

Figure 4:
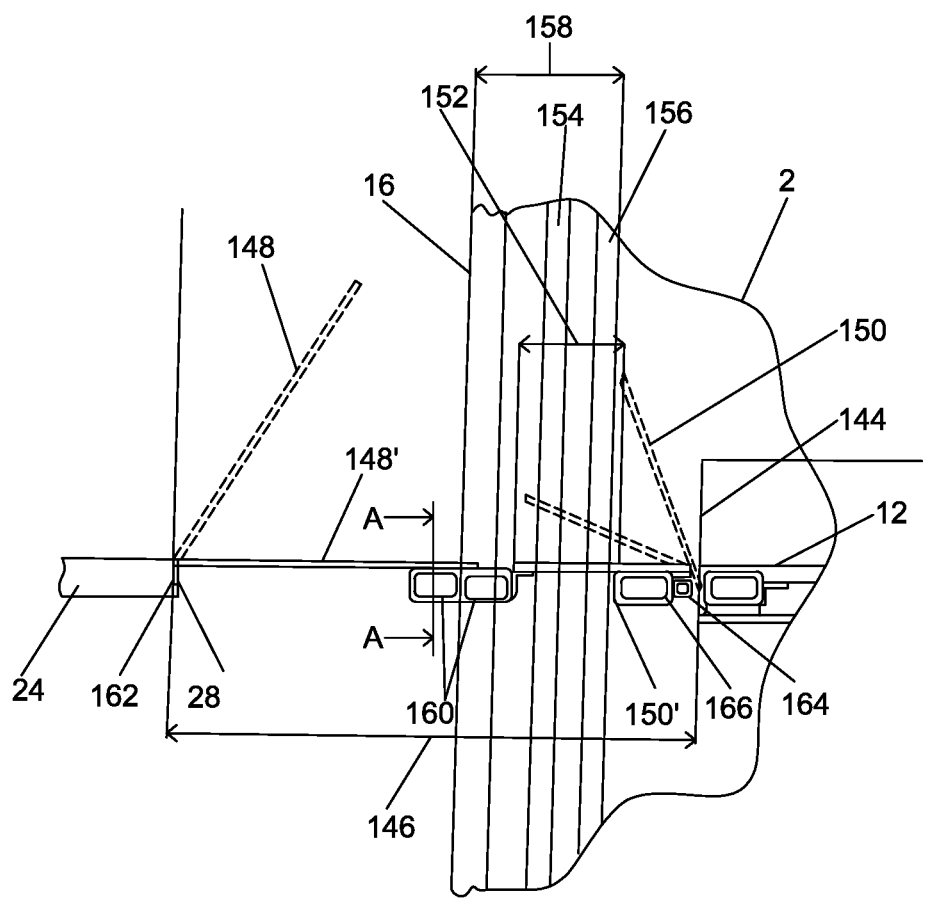
Figure 5A:
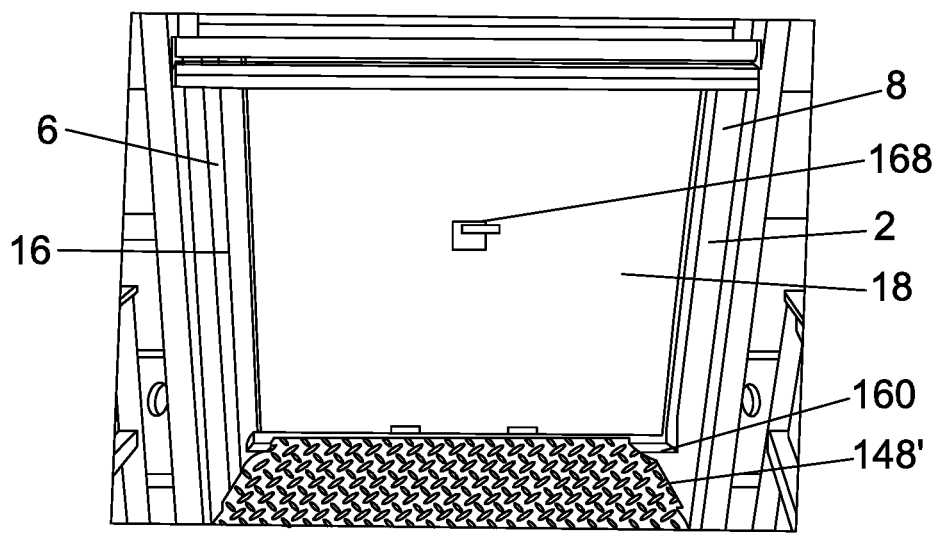
Figure 6:
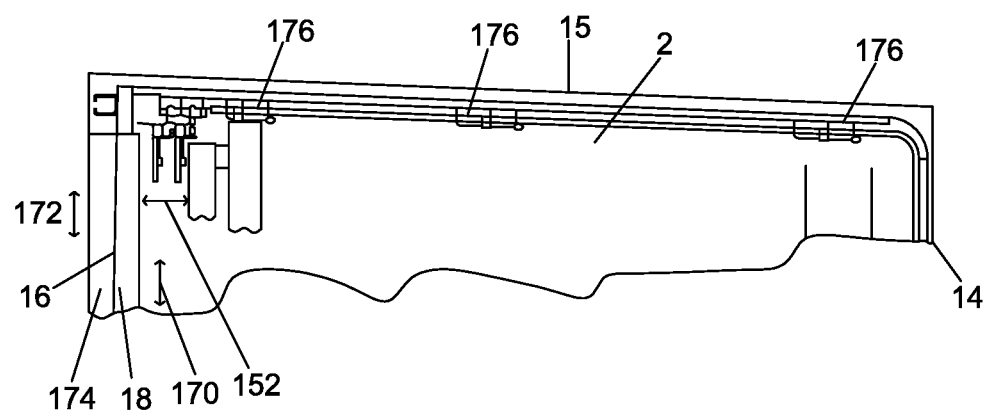
Figure 7A:
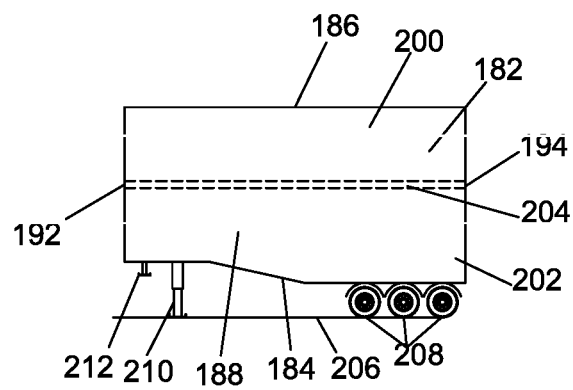
Figure 7B:
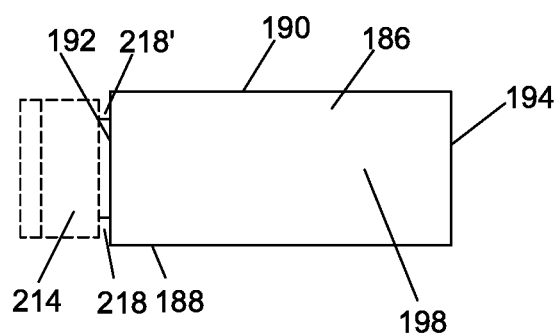
Figure 7C:
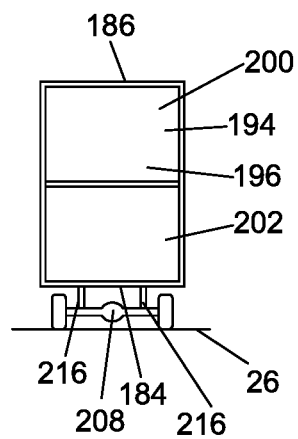
Figure 8A:
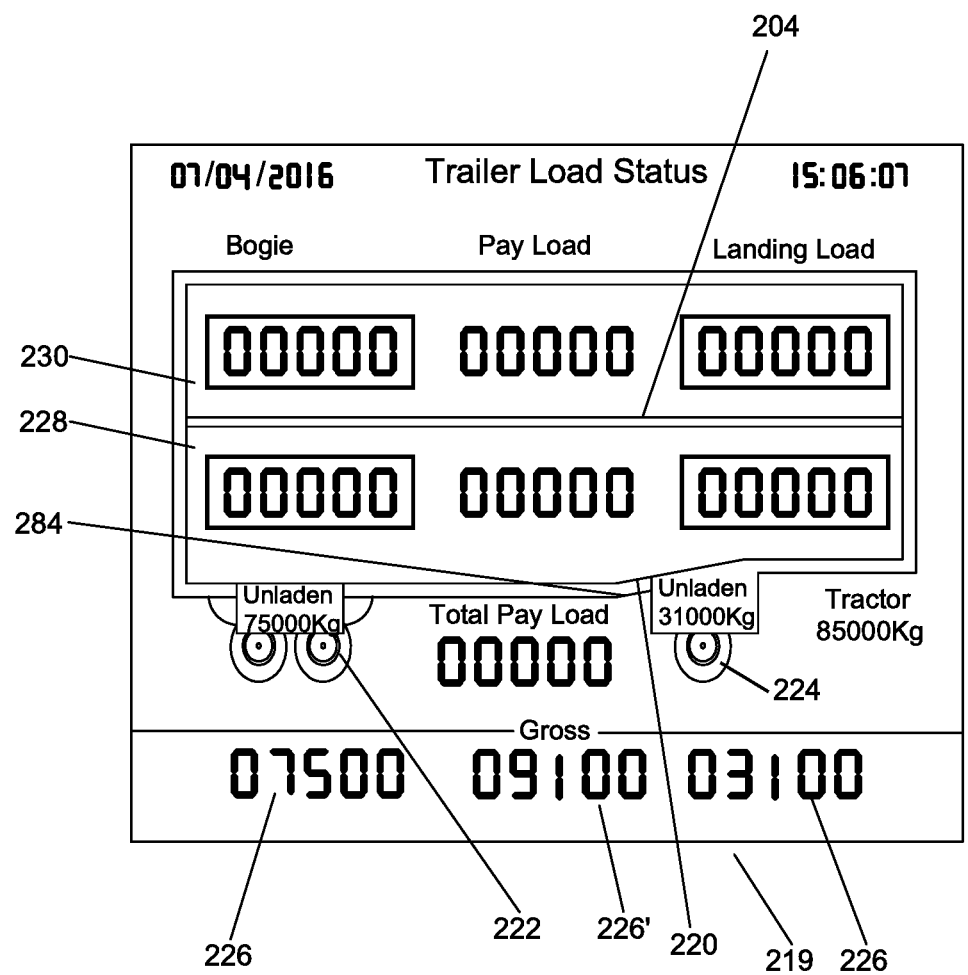
Figure 8B:
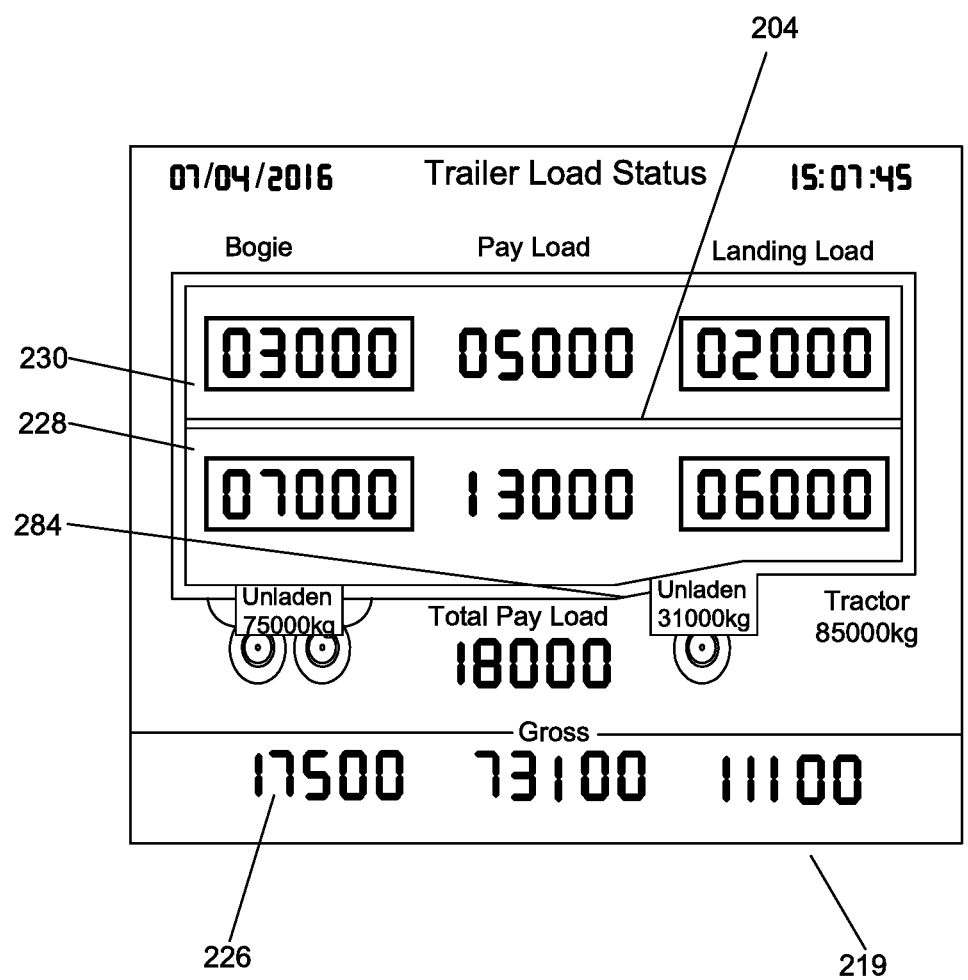
Figure 8C:
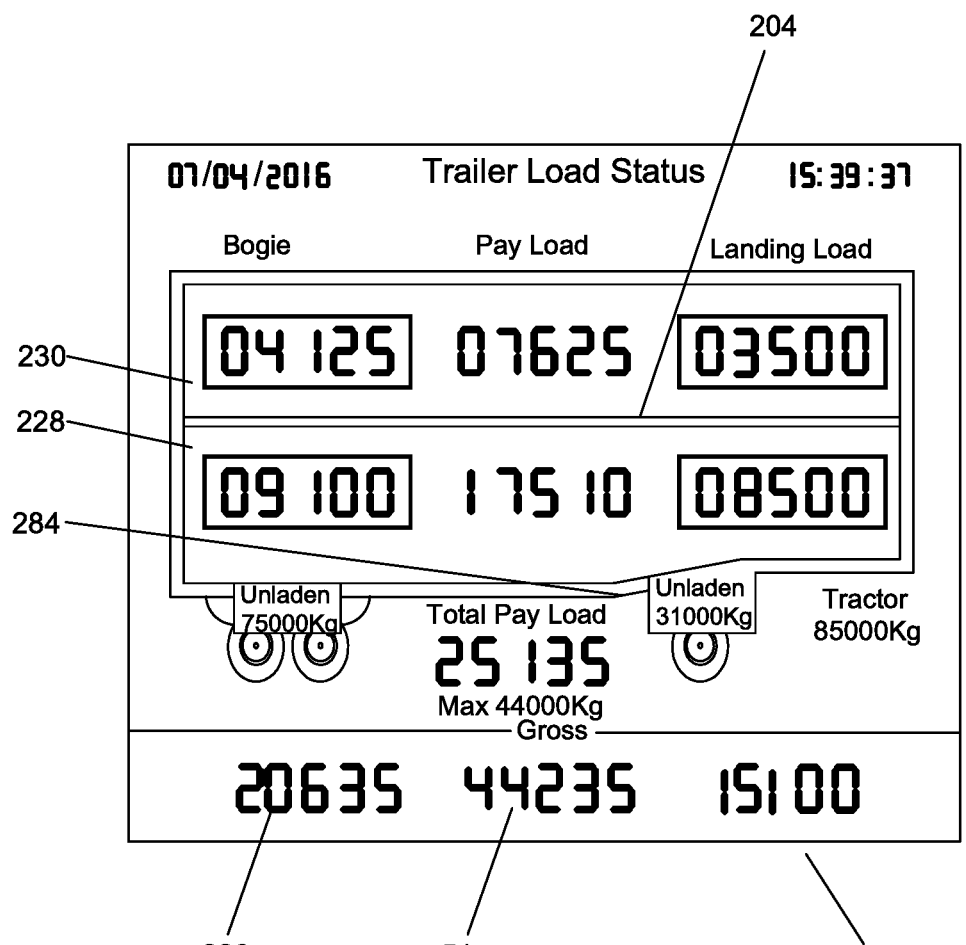

FIG. 4 illustrates a sectional elevation of the support means and bridge assembly in accordance with a second embodiment of the invention;

FIGS. 5a and b illustrate the bridging assembly embodiment of FIG. 4 in partial and fully engaged in use positions;

FIG. 6 illustrates movement apparatus in accordance with a further embodiment of the invention;

FIGS. 7(a) to (c) illustrate views of a trailer in accordance with another embodiment of the invention; and FIGS. 8(a) to (c) illustrate an embodiment of a display screen for use in displaying the detected weight of the trailer in accordance with the embodiment of FIGS. 7a-c of the invention.

Referring firstly to FIG. 1 there is illustrated a movable goods storage area in the form of a vehicle trailer 2 which is located on and movable by a vehicle 4 in a conventional manner. The goods storage area, in this embodiment, is defined by side walls 6,8 a floor 10, a raised floor 12, roof 15, a first end wall 14 and an opposing end 16 in which there is provided an opening 18. The opening, when open, allows the movement of goods into and from the goods storage area 2 and the goods are moved onto and from lifting apparatus 20. The lifting apparatus includes a frame 22 which is provided in a fixed position and on which is mounted a platform 24 and which is movable in the vertical direction indicated by arrow 26 to bring the platform to the height of out of the floors 10,12 as required. A first edge 28 of the frame 22 is positioned such that the end 16 of the trailer 2 can be brought adjacent to the same. At the opposite edge 30 of the frame there is typically provided a second goods storage area in the form of a warehouse 32 such that the lifting apparatus allows the movement of goods between the first and second goods storage areas 2 and 32.

The trailer end 16 is provided with a door assembly 34 to allow the selective opening and closing of the opening 18 and two examples of this are provided in FIGS. 2a and 2b.

FIG. 2a there are provided two door portions 36,38, which are independently movable so that the assembly can be provided in a position to fully close the opening as shown in (i). In FIG. 2a(ii) the panel 38 has been moved to overlap panel 36 and hence create an open area 19 between the first floor 10 and the further floor 12 to allow access to the goods on the lower floor 10 of the trailer. In FIG. 2a(iii) the closure assembly is shown in a configuration in which the panel 36 has been moved to lie behind panel 38 and thereby allow an open area 17 to be created which allows access to the higher storage area defined between the floor 12 and roof 15 and goods thereon.

Thus, it will be appreciated that there is provided an effective closure assembly for the access opening 12. As the panels 36,38 are offset with regard to a vertical plane, so the panels can be housed hugely within the area of the end 16 of the storage area. The panels are moved via guide means, and driven, typically by one or more pulleys, chains or ropes which are located at opposing side edges of the panels 36, 38. Handles can be provided on the panels to allow the same to be grasped for movement between the configurations. The movement can be powered by drive means which may, in one embodiment be located at the underside of the goods storage area, but, more typically will be manually movable. In either case the closure assembly ensures that all of the goods storage area is still available for the storage of goods therein.

A second form of door assembly is shown in FIG. 2*b* in which the door assembly is a shatter door 40 which has a free end 42 which can be moved from the open position adjacent the top of the opening as shown at (i) to the closed position at the floor 10 of the opening as shown at (ii).

In each case it will be appreciated that linear movement of the door assembly 34 is required to be possible in order to allow the same to be moved between open and closed positions and access to be gained to the goods storage area 2 through the opening 18 by at least partially opening the door assembly. In order for this to be possible there is required to be a gap 52 between the edge 44 of the upper floor 12 of the goods storage area trailer 2, and the end 16 of the trailer as shown in FIG. 3*a*. The gap 52 is necessary to accommodate the rear frame of the trailer 2 at the end 16 and, inwardly of the same, the door assembly 34 and provide movement space therefore which, in this embodiment, includes two movement channels 54,56 for movement of the door portions 36,38 of the door assembly 34 shown in FIG. 2*a*. There is also required to be a gap 70 between the edge 28 of the platform and the edge 74 of the lifting apparatus which extends beyond the edge 72 of the frame 22 of the lifting apparatus to accommodate a shutter assembly which is provided to be movable along the axis 80 as indicated by arrow 78.

This means, and as shown in FIG. 3*a*, that when the edge 44 of the floor 12 of the trailer 2 is positioned as close to the edge 28 of the platform 24 as is possible there is still a combined gap 52, 70 between the edge 44 and edge 52 of the platform. The gap 52,70 is such that, if not bridged, access is not possible to the door assembly to operate the same from the platform which is what is required and as a result movement of goods and/or personnel between the platform 24 and storage area floor 12 is not possible.

This problem is solved by the provision of apparatus as now described with reference to FIGS. 3*a-f* which illustrate one embodiment of the invention.

In FIG. 3*a* there is shown the goods storage area trailer 2 having been moved so that the rear end 16 of the same abuts the padded receivers 80 of the lifting apparatus. It is also shown that in accordance with the invention, the platform is provided with a bridging assembly 82 at the edge 28. The bridging assembly is show in a storage, upstanding, position with respect to the platform and therefore acts as a barrier it the edge 28 for the operator 84. It will be appreciated from this Figure that the operator is unable to safely reach out from she platform edge 28 across the gap 70 to try and reach the door assembly to operate the same.

Once the platform has been moved to the height so as to be able to be at the same height required to operate the door release 86 of the door assembly, the move the bridging assembly to the intermediate position shown in FIG. 3*b* in which the inner bridge portion 88 is moved downwardly to lie substantially in line with the platform 24, while the outer bridge portion 90 is still upstanding to allow the gap 52 to be maintained for the movement of the door assembly. The operator 84 can then move onto the inner bridge portion 88 of the bridging assembly as shown and is then able to reach the door release 86 safely as the gap is significantly reduced and this allows the upper door portion 6 to be moved downwardly as indicated by arrow 92 to allow the opening 18 to be open sufficiently to allow access to the floor 12 of the trailer 2.

When this has been achieved the operator can move the platform 24 to the height of the floor 12 of the goods storage area 2 and move the outer bridge portion 90 of the bridging assembly to lie in line with the inner bridge portion and the platform 24. The free end 94 of the bridging assembly contacts with the floor 12 to a sufficient extent to form a bridge across the gap 70, 52 and so the operator 84 can then start to move the goods trolleys 96, in this case from the platform 24 onto the floor 12 as shown to load the floor 12 as is shown in FIG. 3*d*.

When the floor 12 is loaded, the operator can move the outer bridge portion 90 of the bridging assembly to the intermediate position shown in FIG. 3*d* and then lowers the platform 24 to reach the top door release 86 and it turn it to its closed position as indicated by arrow 96. The operator can then move the platform 24 to operate the door release 98 of the lower door and move that upwardly as indicated by arrow 100 as shown in FIG. 3*e* and hence open the opening 18 to allow access to the lower floor 10 of the trailer.

As shown in FIG. 3*f,* the operator 84 can then move the outer bridge pardon 90 of the bridging assembly to be in line with the inner bridge portion 88 and hence bridge the gap and allow the goods trolleys 96 to be moved from the platform 24 across the bridging assembly and onto the floor 10 of the trailer 2.

It should be appreciated that although the bridging assembly and the use of the same is described in FIGS. 3*a-f* with regard to the door assembly shown in FIG. 2*a* the same can be used to advantage with other door assemblies such as that shown to FIG. 2*b* and further assemblies, as the gap which exists between the edge of the platform 24 and the floors of the goods storage area 2 can now be bridged partially to allow operation of the door assembly safely, and completely to allow the safe movement of the goods.

Figure 2:
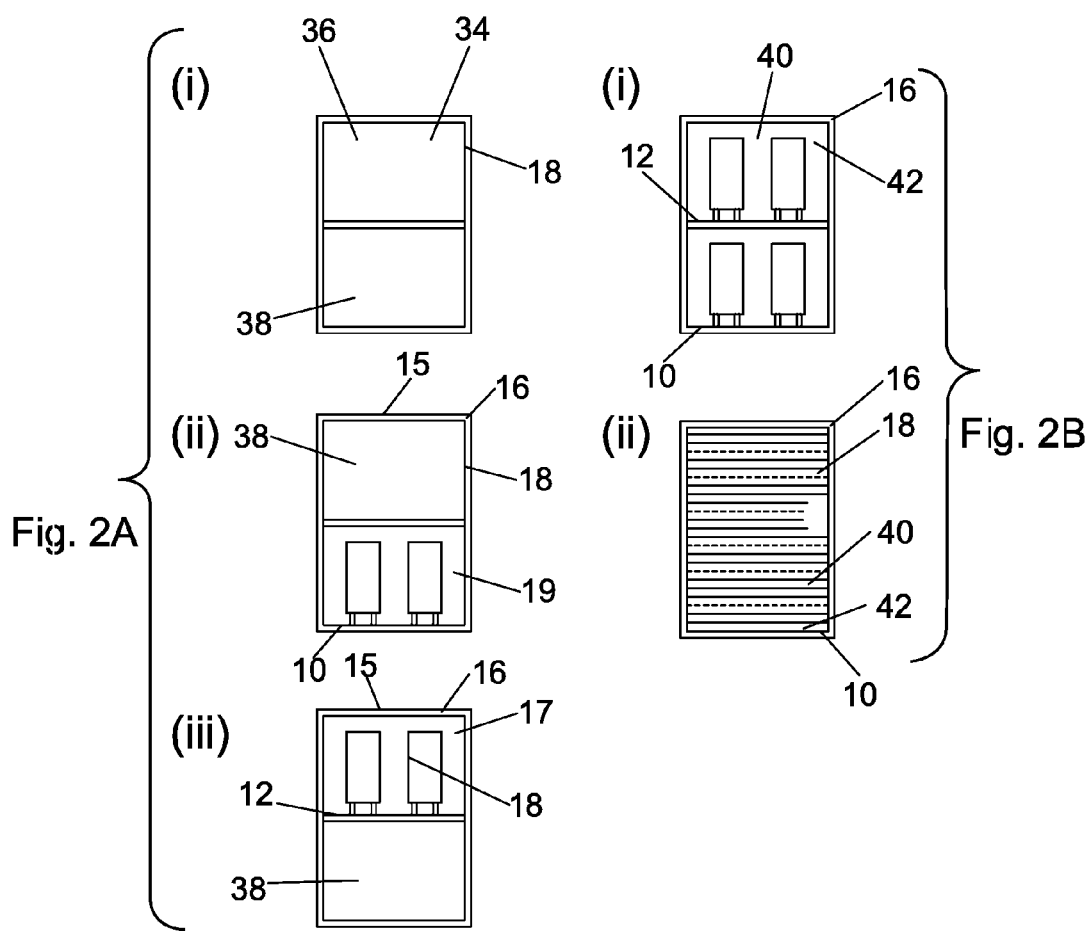
Figure 3:
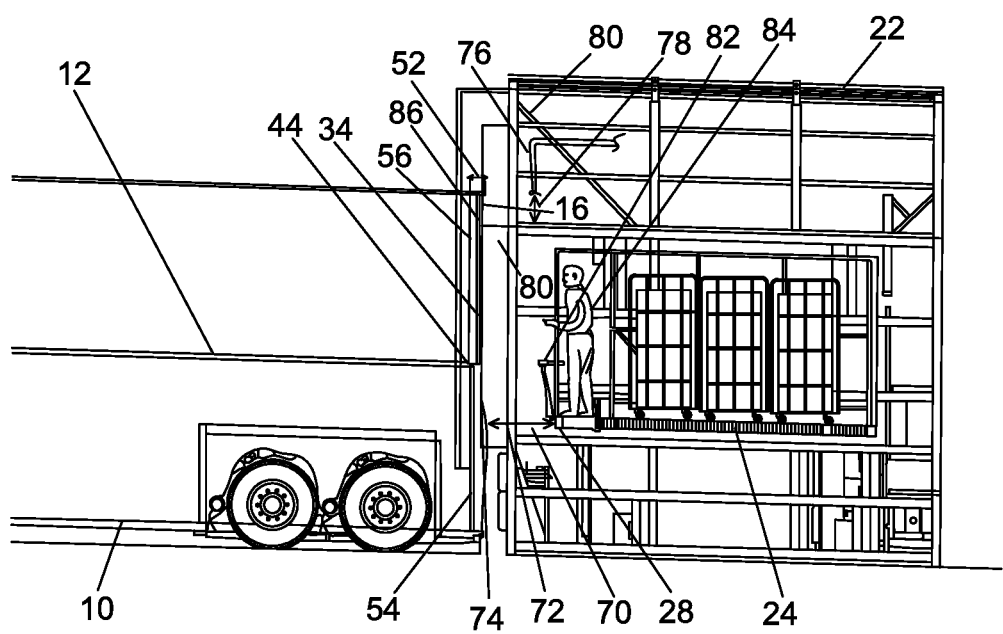
Figure 3:
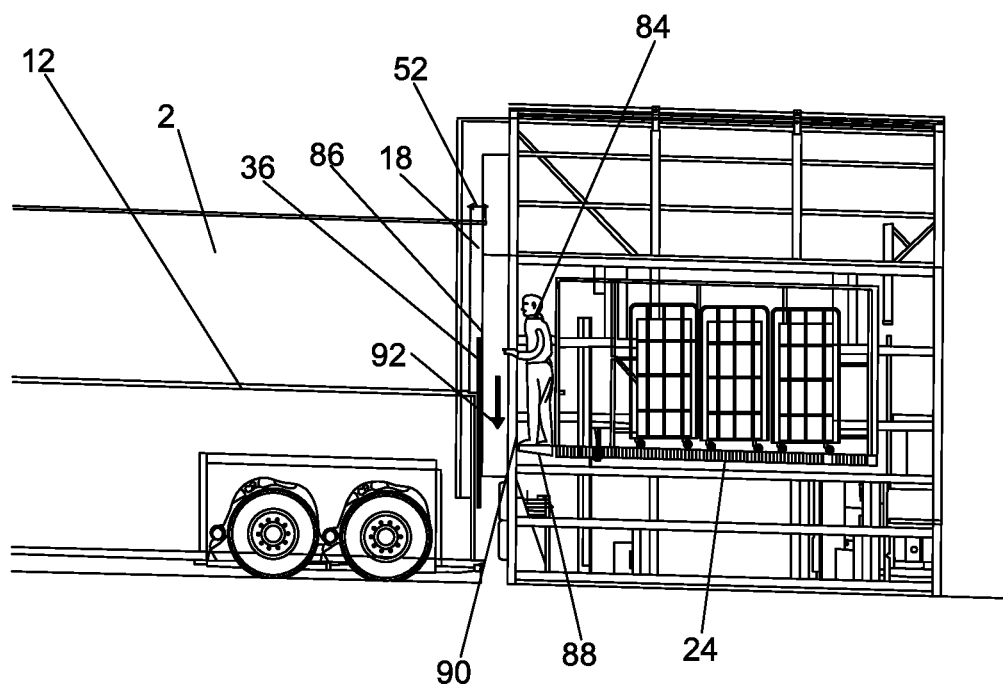
Figure 3:
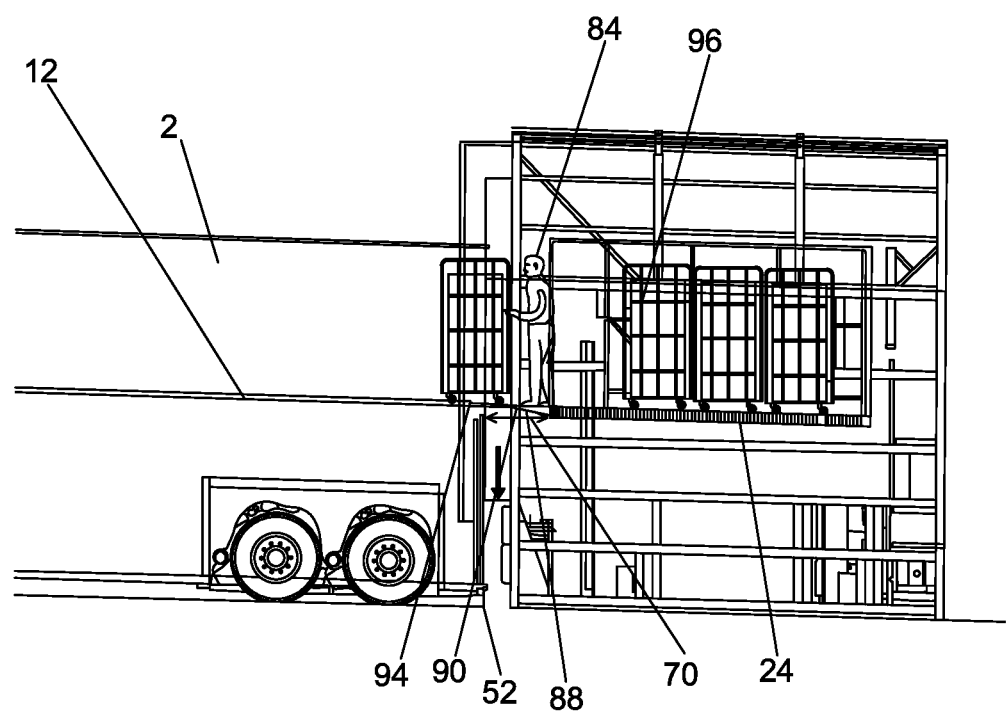
Figure 3:
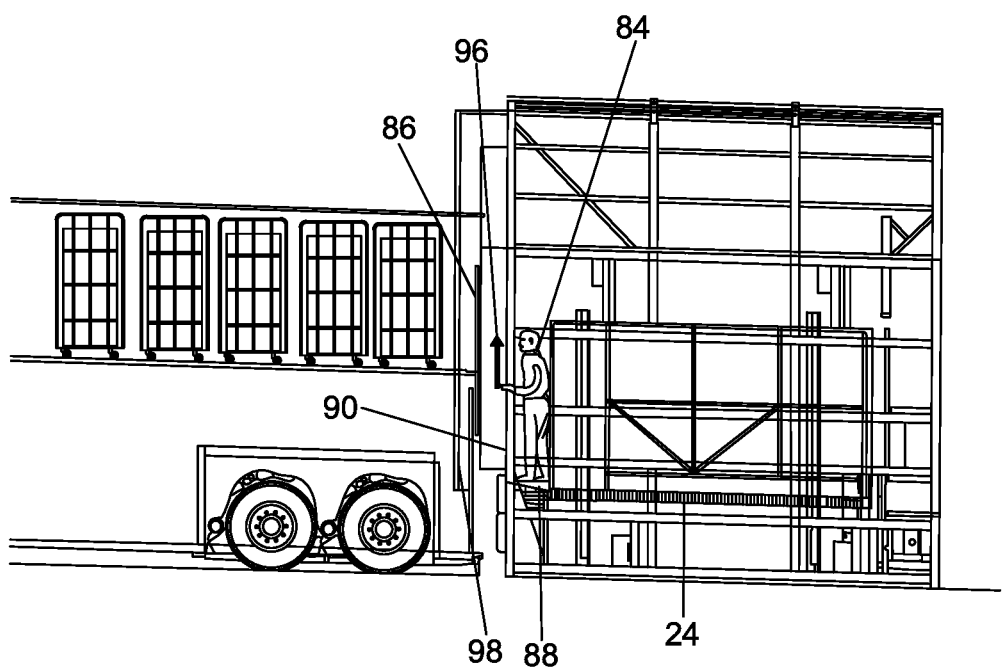
Figure 3:
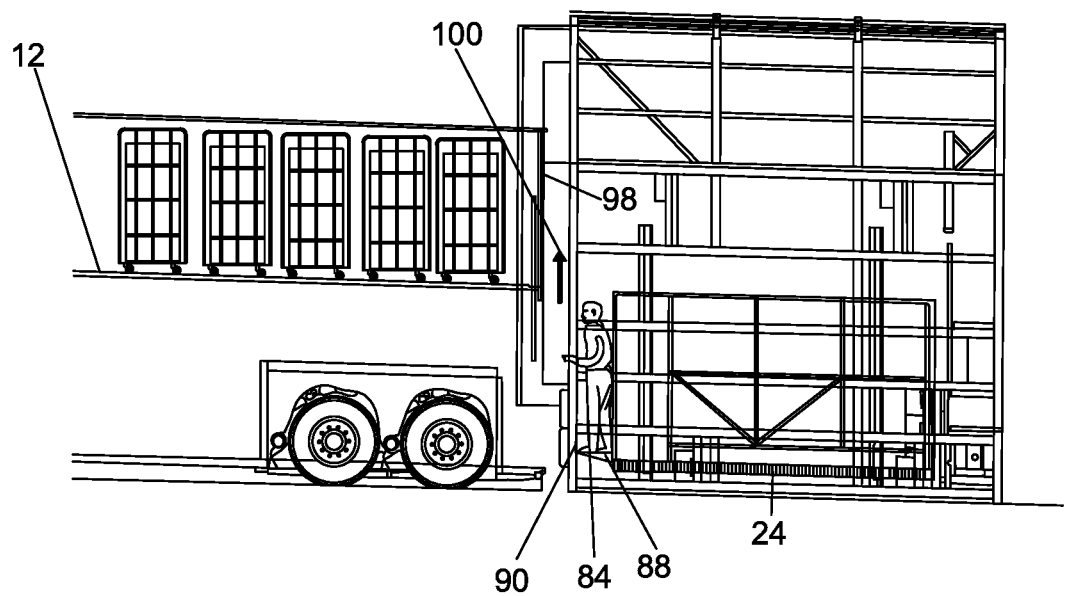
Figure 3:
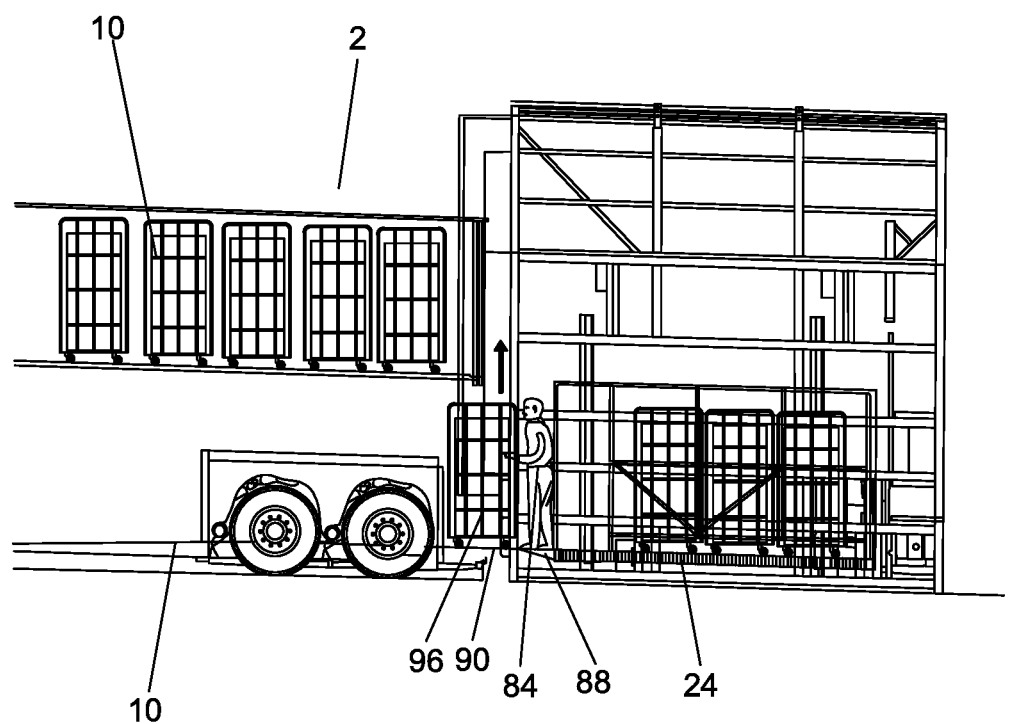

Referring now to FIG. 4 there is illustrated a further embodiment of a bridging assembly in accordance with a second embodiment of the invention for use, once again with the goods storage and lifting apparatus of the type illustrated in FIGS. 1-2*b*. The same reference numerals are used for the components which are common to those show in FIGS. 1-2*b*. In this embodiment, the gap 146 is bridged by the provision of a first bridge portion 148 provided on the platform 24 and a second bridge portion 150, provided on the floor 12 as shown in FIG. 3. The gap is necessary to accommodate the rear frame of the trailer at the end 16 and, inwardly of the same, the door assembly 34 and movement space 152 therefore which, in this embodiment, includes two movement channels 154,156 for movement of the door portions 36,38 of the door assembly 34 shown in FIG. 2*a*.

The bridge portions 148, 150 are each pivotally movable about respective pivot, axes 162, 164 between storage positions shown in broken lines at 148, 150 and in use positions shown at 148', 150', When the bridge portions are in the positions 148', 150' so a goods movement path is provided which allows the goods to be moved between, the platform 24 and the floor 12 as indicated by arrow 158. In order that the bridge portions 148, 150 are supported when in the in-use positions a support means 160 is provided in the form of one or more elongate beams which typically extend across the width of the opening and which are joined at their opposing ends to the respective side walls of the frame of the trailer 2 at the opening 16. The location of the support means ensures that there is still provided the gap 152 between the support means 160 and the edge of the floor 12 such that the door assembly can still be moved when required. Further support members 166 may be provided as part of the trailer frame if required.

FIGS. 5a and b illustrate the manner in which the apparatus may be deployed, with the view shown being from the platform 24 looking towards the end 16 of the trailer 2 which has been brought into position for loading/unloading via the platform 24. Starting from the portion in which both the bridge portions 148, 150 are in the storage position shown in broken lines in FIG. 4 and with the door assembly 34 of the opening 18 in the closed position shown in FIG. 2a(i), it will be seen in FIG. 5a how the bridge portion 148 of the platform can be moved down to the in use position 148' to contact with the support means 160 of the trailer 2 with the door assembly 34 closed and hence the opening 18 still closed.

Figure 5B:
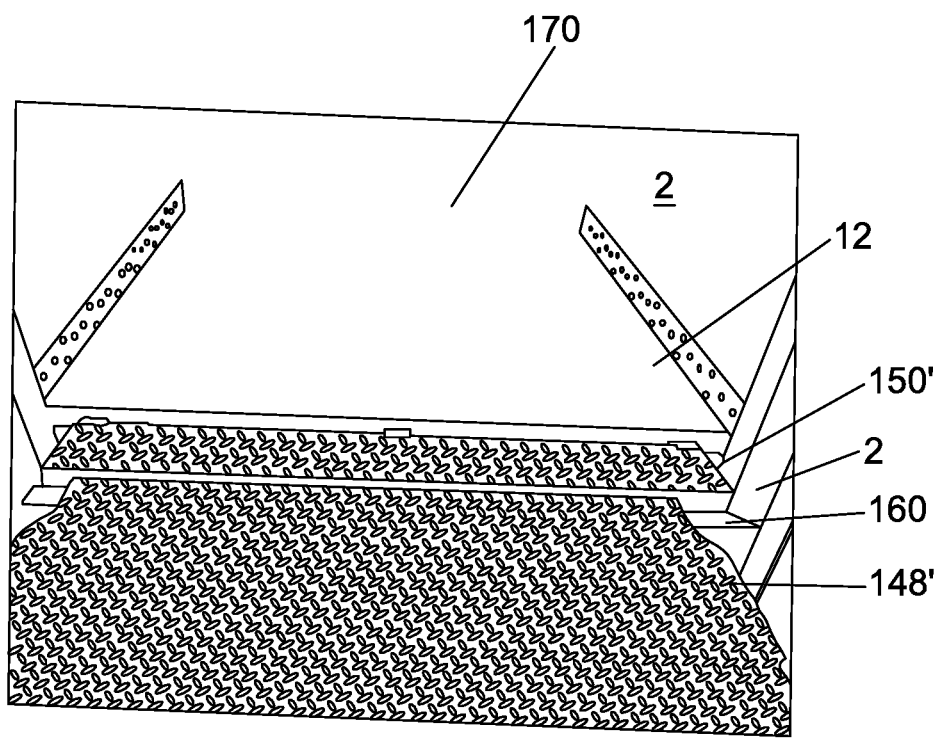

With the bridge portion 148' in position, access can then be gained to the door assembly release handle 168 by an operator when standing on the supported bridge portion 148' and the door assembly can be moved to an open position to allow access to be gained to the interior of the trailer 2 as indicated in FIG. 5b. When the door assembly is fully opened the bridge portion 150 of the floor 12 part of the frame of which is shown covered by boarding 170, can be accessed and this is lowered down to the in use position 150' as shown and which is also supported by the support means 160 as shown so that a bridging path is created between the floor 12 and platform 24.

When loading or unloading is finished, the bridge portion can be moved to the storage position 150 thereby allowing the door assembly 34 to be moved back to the closed position through the gap which is then available again.

FIG. 6 illustrates a side elevation of a storage area trailer 2, the top or roof 15 of which is shown in broken lines. At the end 16 of the same there is again provided an opening 18 with a gap 152 in which the door assembly 34 can be moved between open and closed position as indicated by arrow 170. In addition, in this case the trailer 2 is also fitted with a tall lift assembly with a portion (not shown) provided at the opening 18 which is movable between a substantially horizontal in use position and vertical storage position in a conventional manner. When in the use position, the portion can be stood on and/or goods moved onto and from the same and the portion can be moved vertically as indicated by arrow 172 along guide means 174 mounted on the frame of the trailer 2. The movement of the portion is powered and in accordance with the invention, the powered movement apparatus, such as a hydraulic ram and hydraulic control system is mounted at the opposing end 14 of the trailer so as to increase the available space at the opening 18 of the trailer in comparison to conventional apparatus where the powered movement apparatus would also be located at the opening 18. The powered movement apparatus is connected to the portion and guide means 174 via elongate members such as steel cable or chains (not shown) which pass along the underside of the roof of the trailer and via pulley wheels 176. Typically a first connection is provided towards one side wall 6 at the trailer roof 15 and a second connection is provided towards the opposing side wall 8 of the trailer roof 15. In this way the powered movement of the tail-lift can be achieved with a minimum impact on the space which is required.

With reference now to FIGS. 7a-c, there is illustrated a trailer in accordance with which this embodiment of the invention will now be described.

The trailer 182, comprises a floor 184, a roof 186, side walls 188, 190, a first end wall 192 provided at the front of the trailer and a second end wall 194 provided at the opposing end of the trailer. Typically, the end 194 is provided with a door assembly which allows an opening 196 in the end, to be selectively opened and closed, with the same being opened, to allow access for the movement of goods to and from the interior cavity 198 of the trailer.

In this embodiment, the interior cavity 198 of the trailer is split into two cavity portions, 200, 202, by a provision of a second floor 204 which is vertically spaced from the first floor. As shown, the floors and roof may be provided to diverge towards the opening 194 so as to allow improved access and maximise the use of the cavity space. An example of this form of trailer is described in the applicant's co pending application number GB1515612.8.

The trailer is supported at a safe distance from a support surface 206, via axels and wheels and axles 208 located at the rear of the trailer and support members 210 provided towards the front of the trailer and at typically at both sides of the trailer.

Also provided towards the front of the trailer, is a location means 212 which is provided for location with a tractor unit 214 shown in broken lines in FIG. 7(*b*), and the tractor unit, when attached, forms, in combination with the trailer, the articulated vehicle. However, in many instances, when the trailers are being loaded, the trailer 182 will not be attached to the tractor unit 214 and so there is a need to be able to determine the weight of the goods which are loaded on the trailer at that time.

In accordance with this embodiment of the invention, this is achieved by providing detection means to determine the pressure of the pneumatic suspension system 216 acting on the axles 208 and, from the air pressure readings which change as the weight of the trailer changes, to determine a value for the weight. In addition, the hydraulic oil pressure, if a hydraulic system is used to move the support members 210 to the extended position shown in FIG. 7a, or mechanical force if the movement is manually performed, is also detected by sensing means. The values from these sensing means, which change depending on the weight of the trailer, are monitored so as to provide readings from the points of contact between the trailer body and the support surface 206, these being the air suspension for the rear and load cells for manual movement means or sensors for the hydraulic pressure for the support members 210 at the front of the trailer.

If a hydraulic system is fitted for control of the support members 210 the controls are located at an off side location 218 or 218' which improves the speed of parking trailers and the safety/comfort of the operator.

FIGS. 8a-c illustrate a display screen 219 for use with the trailer to provide a visual indication of the change of weight in the trailer as it is loaded or unloaded. The display indicates, a schematic representation 220 of the trailer and indicates the locations 222, 224 at which the points of contact and hence weight values are calculated. It also indicates in row 226 the total of the weight values at an instant in time for the locations 222, 224 and at 226' the total weight of the trailer.

In FIG. 8a the only weight detected is the weight of the empty trailer. In FIGS. 8b and c the weight values at line 220 change as the goods are loaded onto the trailer and in addition weight values are provided in row 228 for the loads at the locations 222, 224 and the total weight for the goods on the floor 184 of the trailer. At row 230, the weight values are provided for the weight at locations 222 and 224 and for the total weight of goods on floor 204.

The weight of each of goods in each of the cavity portions can be separately identified and also combined to provide a weight for all of the goods in the trailer.

In one embodiment this is achieved by loading the goods onto the floor 4 first and then, once loaded, closing or moving the access doors at the end 14 so as to prevent further access to that floor. Detection means such as microswitches, detect the closure or movement of the doors which allows the weight increase detected at that time to be allocated as the weight of the goods on the lower floor. When the doors are subsequently moved or opened to allow access to load goods onto the second upper floor, the additional load added thereafter is allocated to the second floor.

Typically the sensing means are micro switches which detect the opening and closing or movement of the door parts.

Indicators can be provided on the display screen to indicate which floor is being loaded, with goods at that time and if a load of a floor or the trailer as a whole exceeds a predetermined limit a visual indicator 51 and/or alarm can be generated.

Furthermore historical logs can be provided of the loads which a particular trailer has carried.

A comparison of the FIGS. 2b and c will illustrate that as further goods are added onto the respective floors so the weight values detected will change.

With this information, then the weight of the trailer can be determined without the need for the same to be connected to a tractor unit and/or transported to a location at which there is provided a weighbridge. This also means that the possibility of subsequent weighing of the trailer when connected to a tractor, and only then identifying that the trailer is overloaded is avoided and so expensive unloading and movement of the trailer is avoided.

There is therefore provided in accordance with the invention improvements in the ability to load and unload a trailer and particularly a trailer which is provided for the transport and movement of goods therein.

The invention claimed is:

1. Apparatus for the movement of goods, said apparatus comprising:
    at least one goods storage area having a floor for the location of goods thereon, said goods storage area having an opening through which goods can be moved, said opening selectively closed by a door assembly;
    lifting apparatus including a frame and a platform movable in relation thereto and on which goods can be located,
    when the goods storage area and the lifting apparatus are in an abutting relationship and the said floor and the said platform are at the same height, an edge of the platform and an edge of the said floor are spaced apart by a gap and
    wherein the apparatus includes a bridging assembly including first and second bridge portions selectively movable to form a bridge across the said gap to allow goods to be moved between the said floor and the platform across said bridge and
    said first and second portions are relatively movable to allow the bridging assembly to be provided in
        a storage position in which the said bridge portions are provided in an upstanding position substantially perpendicular to a support surface of the platform,
        an in-use position in which the said bridge portions are substantially in line with the platform surface, and
        a position intermediate the in-use and storage positions and in which the first bridge portion is substantially in line with the platform support surface and the second bridge portion is in the upstanding position and
    when in the in-use position, the free end of the second bridge portion of the bridging assembly extends to and over the edge of the floor of the goods storage area to form a continuous goods movement path between the platform and the floor of the goods storage area and
    wherein when the bridging assembly is in the intermediate position, the gap between the edge of the first bridge portion and the edge of the floor of the goods storage area is less than the gap between the edge of the platform and the edge of the floor of the goods storage area, and
    the goods storage area is provided with a tail lift at the opening into the goods storage area and powered movement apparatus for the tail-lift is located towards the opposing end of the goods storage area from the said opening and is connected to the tail-lift by one or more elongate drive members in the form of chains or cables.

2. Apparatus according to claim 1 wherein when in the intermediate position, the second bridge portion acts as a barrier to prevent a person from stepping out from the edge of the first bridge portion.

3. Apparatus according to claim 1 wherein the first bridge portion is pivotally movable with respect to the platform at a first edge of the first bridge portion and the second bridge portion is pivotally movable with respect to the first bridge portion at a second edge of the first bridge portion.

4. Apparatus according to claim 1 wherein the door assembly is a sliding door assembly formed from a number of portions which can be selectively moved to allow selective access to portions of the opening.

5. Apparatus according to claim 4 wherein first and second vertically spaced floors are provided in the goods storage area with the first floor forming the base and the-second floor located between the first floor and a roof of the goods storage area.

6. Apparatus according to claim 5 wherein the door assembly comprises first and second panel portions which are independently moveable so as to achieve a first configuration in which the access opening is closed, a second configuration in which the panels at least partially overlap to allow access to the storage area defined between the first floor and the second floor, and a third configuration in which the panels at least partially overlap to allow access to the storage area defined between the second floor and the roof.

7. Apparatus according to claim 6 wherein the panels are mounted on pulleys in order to allow the same to be moved.

8. Apparatus according to claim 6 wherein locking means are provided in order to retain at least one of the panels in position in each configuration.

9. Apparatus according to claim 1 wherein said goods storage area includes a portion which is mounted on a second floor and/or a portion which is mounted on a roof of the goods storage area and each portion which is provided is moveable between a first position in which the same is substantially in line with the remainder of the roof, or second floor, respectively and a second position in which at least part of the portion is raised.

10. Apparatus according to claim 1 wherein the said goods storage area is a vehicle trailer which can be moved into position such that the opening through which the goods are to be moved is positioned abutting with the said lifting apparatus.

11. Apparatus according to claim 1 wherein a support means is provided for the first and second bridge portions when in the in use position and the said door assembly is located intermediate the said floor edge and the support means.

12. Apparatus according to claim 11 wherein the support means is provided as part of the goods storage area and the support means and the edge of the floor define opposing side walls of a space through which at least a portion of the door assembly is located.

13. Apparatus according to claim 1 wherein the goods storage area is a trailer and towards a first, front, end of the trailer there are provided a plurality of support members so as to support the trailer at a height from a support surface when the trailer is not attached to a tractor unit, and at or towards a second, rear end of the trailer there are provided a plurality of axles on which wheels are mounted to support and move the trailer along the support surface and wherein, detection means are provided to detect the load which is applied to the plurality of axles and the load which is applied to the support members so as to provide an indication of the weight of the trailer at an instant of time.

14. Apparatus according to claim 13 wherein the detection means for the rear axles, detect the air pressure of a pneumatic air system which controls the operation of the suspension of the rear axles with respect to the trailer and the detected pressure value is translated into an equivalent weight value.

15. Apparatus according to claim 13 wherein the support members are movable between an extended position to provide the support for the trailer and a withdrawn position when the trailer is mounted to the tractor unit.

16. Apparatus according to claim 15 wherein the support members are movable between the said positions by a manual mechanical movement system or by a hydraulic system and the detection means for the support members are located so as to detect the condition of the hydraulic system and/or the force applied to the manual movement system when the support members are in the extended position and the detected values are translated into an equivalent weight value.

17. Apparatus according to claim 13 wherein a visual display is provided at at least one location on the trailer so as to allow the weight of the trailer at that instant of time, to be displayed.

18. Apparatus according to claim 1 wherein the visual display means provides a visual indication if the detected weight value exceeds a predetermined weight limit.

19. Apparatus according to claim 13 wherein the trailer cavity is formed with a first floor and a second floor, spaced vertically from the first, so as to define two cavity portions, both of which are accessed via an opening located at the rear end of the trailer.

20. Apparatus according to claim 19 wherein the weight of the goods in each of the cavity portions is separately identified and also combined to provide a weight for all of the goods in the trailer.

21. Apparatus for the movement of goods, said apparatus comprising:
at least one goods storage area having a floor for the location of goods thereon, said storage area having an opening through which goods can be moved, said opening selectively closed by a door assembly;
lifting apparatus including a frame and a platform movable in relation thereto and on which goods can be located,
when the goods storage area and the lifting apparatus are in an abutting relationship and the said floor and the said platform are at the same height, an edge of the platform and an edge of the said floor are spaced apart by a gap and
wherein the apparatus includes a bridging assembly including at least one bridge portion selectively movable to form a bridge across the said gap to allow goods to be moved between the said floor and the platform across said bridge and said at least one bridge portion is moveable between a withdrawn storage position and an in-use bridging position,
wherein the goods storage area is provided with a tail lift at the opening into the goods storage area and powered movement apparatus for the tail-lift is located towards the opposing end of the goods storage area from the said opening and is connected to the tail-lift by one or more elongate drive members in the form of chains or cables.

* * * * *